US008163855B2

(12) United States Patent
Luo et al.

(10) Patent No.: US 8,163,855 B2
(45) Date of Patent: *Apr. 24, 2012

(54) METHOD FOR BULK POLYMERIZATION

(75) Inventors: Steven Luo, Copley, OH (US); Mark W. Smale, Hudson, OH (US); Kevin McCauley, Coventry Township, OH (US); Randhir Shetty, Chapel Hill, NC (US)

(73) Assignee: Bridgestone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/936,571

(22) PCT Filed: Apr. 6, 2009

(86) PCT No.: PCT/US2009/039639
§ 371 (c)(1),
(2), (4) Date: Nov. 11, 2010

(87) PCT Pub. No.: WO2009/126567
PCT Pub. Date: Oct. 15, 2009

(65) Prior Publication Data
US 2011/0046327 A1  Feb. 24, 2011

Related U.S. Application Data

(63) Continuation of application No. 12/098,882, filed on Apr. 7, 2008, now Pat. No. 7,807,763.

(51) Int. Cl.
*C08F 4/52* (2006.01)
*C08F 2/02* (2006.01)
*C08F 36/04* (2006.01)

(52) U.S. Cl. .................. 526/164; 526/902; 526/903

(58) Field of Classification Search .................. 526/164, 526/172, 902, 903
See application file for complete search history.

(56) References Cited

U.S. PATENT DOCUMENTS

| | | |
|---|---|---|
| 3,297,667 A | 1/1967 | von Dohlen et al. |
| 3,541,063 A | 11/1970 | Throckmorton et al. |
| 3,794,604 A | 2/1974 | Throckmorton et al. |
| 4,444,903 A | 4/1984 | Carbonaro et al. |
| 4,461,883 A | 7/1984 | Takeuchi et al. |
| 4,525,594 A | 6/1985 | Pschunder |
| 4,699,960 A | 10/1987 | Gordini et al. |
| 4,906,706 A | 3/1990 | Hattori et al. |
| 4,942,147 A | 7/1990 | Karol et al. |
| 4,990,573 A | 2/1991 | Andreussi et al. |
| 5,017,539 A | 5/1991 | Jenkins et al. |
| 5,064,910 A | 11/1991 | Hattori et al. |
| 5,276,115 A * | 1/1994 | Bohmer et al. ............. 526/126 |
| 5,428,119 A | 6/1995 | Knauf et al. |
| 5,567,784 A | 10/1996 | Wieder et al. |
| 5,844,050 A | 12/1998 | Fukahori et al. |
| 5,908,904 A * | 6/1999 | Sylvester et al. ............ 526/153 |
| 6,346,584 B1 | 2/2002 | Wenzel et al. |
| 6,399,732 B2 | 6/2002 | Luo |
| 6,528,588 B2 | 3/2003 | Luo |
| 6,632,739 B2 | 10/2003 | Watatani |
| 6,713,573 B2 | 3/2004 | Wenzel et al. |
| 6,861,483 B2 | 3/2005 | Wenzel et al. |
| 6,897,270 B2 | 5/2005 | Ozawa et al. |
| 6,977,281 B1 | 12/2005 | Ozawa et al. |
| 6,992,147 B1 | 1/2006 | Ozawa et al. |
| 7,094,849 B2 | 8/2006 | Luo et al. |
| 7,351,776 B2 | 4/2008 | Tartamella et al. |
| 7,807,763 B2 | 10/2010 | Smale et al. |
| 2004/0106751 A1* | 6/2004 | Wenzel et al. ............... 526/82 |
| 2005/0197474 A1* | 9/2005 | Tartamella et al. ........... 526/335 |

FOREIGN PATENT DOCUMENTS

| | | |
|---|---|---|
| JP | 05-051406 | 3/1993 |
| JP | 05-059103 | 3/1993 |
| JP | 10-306113 | 11/1998 |
| JP | 11-035633 | 2/1999 |

OTHER PUBLICATIONS

International Preliminary Report on Patentability, International Appl. No. PCT/US2009/039639 dated Oct 12, 2010; 7 pages.
International Search Report, International Appl. No. PCT/US2009/039639 dated Jul. 2, 2009; 3 pages.

* cited by examiner

*Primary Examiner* — Fred M Teskin
(74) *Attorney, Agent, or Firm* — Meredith E. Hooker; Arthur Reginelli

(57) ABSTRACT

A method for polymerizing conjugated diene monomer into polydienes, the method comprising: polymerizing conjugated diene monomer within a liquid-phase polymerization mixture that includes conjugated diene monomer, a lanthanide-based catalyst system, dicyclopentadiene or substituted dicyclopentadiene, and optionally organic solvent, with the proviso that the organic solvent, if present, is less than about 20% by weight based on the total weight of the polymerization mixture.

10 Claims, 3 Drawing Sheets

METHOD FOR BULK POLYMERIZATION

This application is the National Stage of International Application No. PCT/US2009/039639, internationally filed on Apr. 6, 2009 which is a continuation of U.S. Non-Provisional application Ser. No. 12/098,882, filed on Apr. 7, 2008 now U.S. Pat. No. 7,807,763, and is incorporated herein by reference.

FIELD OF THE INVENTION

One or more embodiments of the invention relate to a method for the bulk polymerization of conjugated diene monomer in the presence of dicyclopentadiene or substituted dicyclopentadiene.

BACKGROUND OF THE INVENTION

Polydienes are most often produced by solution polymerization, wherein conjugated diene monomer is polymerized in an inert solvent or diluent. The solvent serves to solubilize the reactants and product, to act as a carrier for the reactants and product, to aid in the transfer of the heat of polymerization, and to help in moderating the polymerization rate. The solvent also allows easier stirring and transferring of the polymerization mixture (also called cement), since the viscosity of the cement is decreased by the presence of the solvent.

Nevertheless, the presence of the solvent presents a number of difficulties. The solvent must be separated from the polymer and then recycled for reuse or otherwise disposed of as waste. The cost of recovering and recycling the solvent adds greatly to the cost of the polymer being produced, and there is always the risk that the recycled solvent after purification may still retain some impurities that will poison the polymerization catalyst. In addition, some solvents such as aromatic hydrocarbons can raise environmental concerns. Further, the purity of the polymer product may be affected if there are difficulties in removing the solvent.

Polydienes may also be produced by bulk polymerization (also called mass polymerization), wherein the polymerization mixture is typically solventless; i.e., the monomer is polymerized in the absence or substantial absence of any solvent, and in effect, the monomer itself acts as a diluent. Since bulk polymerization involves mainly monomer and catalyst, there is reduced potential for contamination and the product separation may be simplified. Economic advantages including lower capital cost for new plant capacity, lower energy cost to operate, and fewer people to operate may be realized. The solventless feature may also provide environmental advantages with reduced emissions and wastewater pollution.

Nonetheless, bulk polymerization may require careful temperature control, and there may be a need for strong and elaborate stirring equipment since the viscosity of the polymerization mixture may become very high. In the absence of added diluent, the cement viscosity and exotherm effects may make temperature control very difficult. Also, cis-1,4-polybutadiene is insoluble in 1,3-butadiene monomer at elevated temperatures. Consequently, local hot spots may occur, resulting in degradation, gelation, and/or discoloration of the polymer product. In the extreme case, disastrous "runaway" reactions may occur.

Olefins, which are distinct from conjugated dienes, have commonly been polymerized by gas-phase polymerization or slurry-phase polymerization techniques that employ solid-supported catalysts. These gas-phase or slurry polymerization processes have been plagued by reactor fouling or sheeting, which has caused operability problems. For example, fouling of gas-phase polymerization reactors during the production of polyethylene or polypropylene is a well known problem. It is believed that this fouling is caused by an uncontrolled reaction caused by catalyst embedded within polymer stuck to reactor or pipe surfaces.

The prior art has addressed the problems of fouling or sheeting within gas-phase or slurry-phase reactors employed for olefin polymerization by employing several approaches. For example, U.S. Pat. No. 6,632,769 discloses the use of additives that change phase when heated and thereby release a catalyst poison. U.S. Pat. No. 6,346,584 describes the use of a binary system that reacts above a desired threshold temperature to generate a catalyst poison. U.S. Pat. No. 6,713,573 discloses the use of additive systems that undergo thermal decomposition at temperatures above a desired threshold to generate a catalyst poison. U.S. Pat. No. 4,942,147 discloses a transition metal catalyst system containing an autoacceleration inhibitor.

Since the advantages associated with bulk polymerization systems are very attractive, there is a need to improve bulk polymerization systems. Further, a method is needed to prevent runaway reactions in liquid-phase bulk polymerizations.

Arriving at a solution to prevent runaway reactions during lanthanide-catalyzed conjugated diene polymerization, however, is not trivial. Unlike gas-phase or slurry-phase olefin polymerization, the bulk polymerization of conjugated dienes occurs in the liquid phase. And, the catalyst system is dissolved in the monomer/polydiene mixture. Moreover, lanthanide-based catalyst systems are notoriously susceptible to impurities. That is, various impurities can have a deleterious impact on these catalyst systems and the polymerizations in which they are used.

SUMMARY OF THE INVENTION

In one or more embodiments, the present invention provides a method for polymerizing conjugated diene monomer into polydienes, the method comprising: polymerizing conjugated diene monomer within a liquid-phase polymerization mixture that includes conjugated diene monomer, a lanthanide-based catalyst system, dicyclopentadiene or substituted dicyclopentadiene, and optionally organic solvent, with the proviso that the organic solvent, if present, is less than about 20% by weight based on the total weight of the polymerization mixture.

In one or more embodiments, the present invention also provides a method for preparing a polydiene, the method comprising the steps of: (i) introducing conjugated diene monomer, a lanthanide-based catalyst system, dicyclopentadiene or substituted dicyclopentadiene, and optionally organic solvent to a reactor to form a liquid-phase polymerization mixture including less than 20% by weight of organic solvent based on the total weight of the polymerization mixture; and (ii) allowing the monomer to polymerize in the presence of the lanthanide-based catalyst system and the dicyclopentadiene or substituted dicyclopentadiene within the liquid-phase polymerization mixture to form a polydiene.

Other embodiments of the present invention provide a composition comprising: (i) a lanthanide-based catalyst system; (ii) conjugated diene monomer; (iii) polydiene; and (iv) dicyclopentadiene or substituted dicyclopentadiene, with the proviso that the composition includes less than about 20% by weight of organic solvent based on the total weight of the composition.

DETAILED DESCRIPTION OF ILLUSTRATIVE EMBODIMENTS

Figure 1:
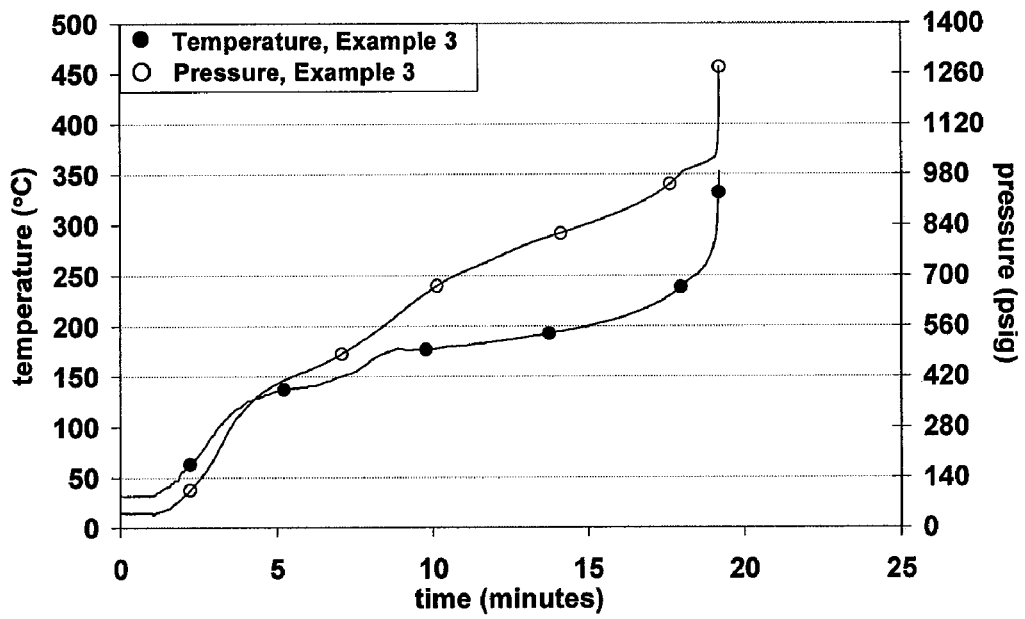
FIG. 1 is a temperature and pressure profile of the polymerization described in Example 3.

One or more embodiments of the present invention provide a method for the bulk polymerization of conjugated diene monomer in the presence of dicyclopentadiene or substituted dicyclopentadiene. In one or more embodiments, a lanthanide-based catalyst system is employed to effect the polymerization. It has unexpectedly been discovered that dicyclopentadiene or substituted dicyclopentadiene can be present without a deleterious impact on the bulk polymerization of the conjugated diene monomer while gaining the benefit of a compound that will thermally decompose and deactivate the catalyst. Advantageously, this decomposition takes place at temperatures above where the polymerization takes place but below temperatures where the polymerization can no longer be controlled.

The polymerization of conjugated diene according to this invention takes place within a bulk or high-solids polymerization mixture. Within this mixture, liquid-phase monomer is converted to polymer, which may or may not be soluble in the monomer. As those skilled in the art appreciate, there may be an equilibrium between monomer in the gas phase and monomer within the liquid phase in the reactor. Those skilled in the art also understand that the equilibrium may be affected by various conditions. Nonetheless, polymerization of monomer according to the present invention occurs in the liquid phase.

In one or more embodiments, the polymerization process of the present invention is conducted within a polymerization mixture that includes less than about 20%, in other embodiments less than about 10%, in other embodiments less than about 5%, and in other embodiments less than about 2% by weight organic solvent based on the total weight of the monomer, polymer, and solvent within the mixture. In one embodiment, the process is carried out in the substantial absence of an organic solvent or diluent, which refers to the absence of that amount of solvent that would otherwise have an appreciable impact on the polymerization process. Stated another way, those skilled in the art will appreciate the benefits of bulk polymerization processes (i.e., processes where monomer acts as the solvent), and therefore the process of this invention may be conducted in the presence of less organic solvent than will deleteriously impact the benefits sought by conducting the process in bulk. In another embodiment, the process may be carried out in the absence of an organic solvent or diluent other than those organic solvents or diluents that are inherent to the raw materials employed. In yet another embodiment, the polymerization system is devoid of organic solvent.

A variety of organic solvents may be employed in practicing the present invention. The term organic solvent or diluent is used herein conventionally; that is, it refers to organic compounds that will not polymerize or enter into the structure of the polymer to be produced. Typically, these organic solvents are non-reactive or inert to the catalyst composition. Exemplary organic solvents include aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Commercial mixtures of the above hydrocarbons may also be used.

Other examples of organic solvents include high-boiling hydrocarbons of high molecular weights, such as paraffinic oil, aromatic oil, or other hydrocarbon oils that are commonly used to oil-extend polymers. Since these hydrocarbons are non-volatile, they typically do not require separation and remain with the polymer. The performance characteristics of the polymer are generally not affected appreciably when the content of high molecular weight hydrocarbons is less than about 5% by weight of the polymer.

Various conjugated diene monomer or mixtures thereof can be employed. Examples of conjugated diene monomer include 1,3-butadiene, isoprene, 1,3-pentadiene, 1,3-hexadiene, 2,3-dimethyl-1,3-butadiene, 2-ethyl-1,3-butadiene, 2-methyl-1,3-penta-diene, 3-methyl-1,3-pentadiene, 4-methyl-1,3-pentadiene, 2,4-hexadiene, and mixtures thereof.

In certain embodiments, it may be beneficial to control the humidity (i.e., water content) of the monomer. For example, where certain lanthanide-based catalyst systems are employed, it may be beneficial to dry the monomer. In one embodiment, the level of water within the monomer is reduced below about 20 ppm, in other embodiments below about 10 ppm, in other embodiments below about 5 ppm, and in other embodiments below about 3 ppm.

In one or more embodiments, the catalyst system employed in practicing the process of this invention is a lanthanide-based catalyst system. In one or more embodiments, the lanthanide-based catalyst system is formed by combining (a) a lanthanide compound, (b) an alkylating agent, and (c) a halogen-containing compound. Other reagents such as other organometallic compounds or Lewis bases may also optionally be included. Lanthanide-based catalyst systems are well known in the art as described in U.S. Pat. Nos. 3,297,667, 3,541,063, 3,794,604, 4,461,883, 4,444,903, 4,525,594, 4,699,960, 5,017,539, 5,428,119, 5,064,910, 6,897,270 and 5,844,050, which are incorporated herein by reference.

Various lanthanide compounds or mixtures thereof may be employed as ingredient (a) of the lanthanide-based catalyst system. In one or more embodiments, these compounds are soluble in hydrocarbon solvents such as aromatic hydrocarbons, aliphatic hydrocarbons, or cycloaliphatic hydrocarbons. Hydrocarbon-insoluble lanthanide compounds, however, may be suspended in the polymerization mixture to form the catalytically active species and are also useful.

Lanthanide compounds include at least one atom of lanthanum, neodymium, cerium, praseodymium, promethium, samarium, europium, gadolinium, terbium, dysprosium, holmium, erbium, thulium, ytterbium, lutetium, and didymium. In particular embodiments, these compounds include neodymium, lanthanum, samarium, or didymium. Didymium is a commercial mixture of rare-earth elements obtained from monazite sand.

The lanthanide atom in the lanthanide compounds may be in various oxidation states including but not limited to the 0, +2, +3, and +4 oxidation states. Trivalent lanthanide compounds, where the lanthanide atom is in the +3 oxidation state, are particularly useful in one or more embodiments. Suitable lanthanide compounds include, but are not limited to, lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, lanthanide halides, lanthanide pseudo-halides, lanthanide oxyhalides, and organolanthanide compounds.

Various alkylating agents, or mixtures thereof, may be used as component (b) of the lanthanide-based catalyst system. Alkylating agents, which may also be referred to as hydrocarbylating agents, are organometallic compounds that may transfer hydrocarbyl groups to another metal. Typically, these agents are organometallic compounds of electropositive metals such as Groups 1, 2, and 3 metals (Groups IA, IIA, and IIIA metals). Preferred alkylating agents include organoaluminum and organomagnesium compounds. Where the alkylating agent includes a labile halogen atom, the alkylating agent may also serve as the halogen-containing compound. In one or more embodiments, mixed alkylating systems may be used such as those disclosed in U.S. Pat. No. 7,094,849, which is incorporated herein by reference.

The term "organoaluminum compound" refers to any aluminum compound containing at least one aluminum-carbon bond. Organoaluminum compounds that are soluble in a hydrocarbon solvent are preferred.

One class of organoaluminum compounds that may be utilized is represented by the general formula $AlR_nX_{3-n}$, where each R, which may be the same or different, is a mono-valent organic group that is attached to the aluminum atom via a carbon atom, where each X, which may be the same or different, is a hydrogen atom, a halogen atom, a carboxylate group, an alkoxide group, or an aryloxide group, and where n is an integer of 1 to 3. Each R may be a hydrocarbyl group such as, but not limited to, alkyl, cycloalkyl, substituted cycloalkyl, alkenyl, cycloalkenyl, substituted cycloalkenyl, awl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, boron, silicon, sulfur, and phosphorus atoms.

Another class of suitable organoaluminum compounds is aluminoxanes. Aluminoxanes comprise oligomeric linear aluminoxanes that may be represented by the general formula:

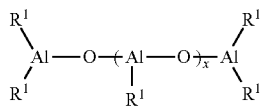

and oligomeric cyclic aluminoxanes that may be represented by the general formula:

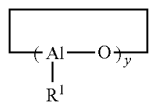

where x is an integer of 1 to about 100, preferably about 10 to about 50; y is an integer of 2 to about 100, preferably about 3 to about 20; and where each $R^1$, which may be the same or different, is a mono-valent organic group that is attached to the aluminum atom via a carbon atom. Each $R^1$ may be a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, boron, silicon, sulfur, and phosphorus atoms. It should be noted that the number of moles of the aluminoxane as used in this application refers to the number of moles of the aluminum atoms rather than the number of moles of the oligomeric aluminoxane molecules. This convention is commonly employed in the art of catalysis utilizing aluminoxanes.

Aluminoxanes may be prepared by reacting trihydrocarbylaluminum compounds with water. This reaction may be performed according to known methods, such as (1) a method in which the trihydrocarbylaluminum compound is dissolved in an organic solvent and then contacted with water, (2) a method in which the trihydrocarbylaluminum compound is reacted with water of crystallization contained in, for example, metal salts, or water adsorbed in inorganic or organic compounds, and (3) a method in which the trihydrocarbylaluminum compound is reacted with water in the presence of the monomer or monomer solution that is to be polymerized.

The term organomagnesium compound refers to any magnesium compound that contains at least one magnesium-carbon bond. Organomagnesium compounds that are soluble in a hydrocarbon solvent are preferred. One class of organomagnesium compounds that may be utilized is represented by the general formula $MgR_2$, where each R, which may be the same or different, is a mono-valent organic group, with the proviso that the group is attached to the magnesium atom via a carbon atom. Each R may be a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atom.

Another class of organomagnesium compounds that may be utilized as ingredient (b) is represented by the general formula RMgX, where R is a mono-valent organic group, with the proviso that the group is attached to the magnesium atom via a carbon atom, and X is a hydrogen atom, a halogen atom, a carboxylate group, an alkoxide group, or an aryloxide group. Preferably, R is a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, boron, silicon, sulfur, and phosphorus atoms. Preferably, X is a carboxylate group, an alkoxide group, or an aryloxide group, with each group preferably containing 1 to 20 carbon atoms.

Various compounds, or mixtures thereof, that contain one or more labile halogen atoms may be employed as ingredient (c) of the lanthanide-based catalyst system. These compounds may simply be referred to as halogen-containing compounds. Examples of halogen atoms include, but are not limited to, fluorine, chlorine, bromine, and iodine. A combination of two or more halogen atoms may also be utilized. Halogen-containing compounds that are soluble in a hydrocarbon solvent are preferred. Hydrocarbon-insoluble halogen-containing compounds, however, may be suspended in the oligomerization medium to form the catalytically active species, and are therefore useful.

Useful types of halogen-containing compounds include, but are not limited to, elemental halogens, mixed halogens, hydrogen halides, organic halides, inorganic halides, metallic halides, organometallic halides, and mixtures thereof.

The lanthanide-based catalyst system has very high catalytic activity for polymerizing conjugated dienes into stereoregular polydienes over a wide range of catalyst concentrations and catalyst ingredient ratios. It is believed that the catalyst ingredients (a), (b), and (c) may interact to form an active catalyst species. Accordingly, the optimum concentration for any one catalyst ingredient is dependent upon the concentrations of the other catalyst ingredients. In one embodiment, the molar ratio of the alkylating agent to the lanthanide compound (alkylating agent/Ln) may be varied from about 1:1 to about 200:1, in other embodiments from about 2:1 to about 100:1, and in other embodiments from about 5:1 to about 50:1. The molar ratio of the halogen-containing compound to the lanthanide compound (halogen atom/Ln) may be varied from about 0.5:1 to about 20:1, in other embodiments from about 1:1 to about 10:1, and in other embodiments from about 2:1 to about 6:1. The term molar ratio, as used herein, refers to the equivalent ratio of relevant components of the ingredients, e.g., equivalents of halogen atoms on the halogen-containing compound to lanthanide atoms on the lanthanide compound.

The lanthanide-based catalyst system may be formed by combining or mixing the catalyst ingredients (a), (b), and (c). Although an active catalyst species is believed to result from this combination, the degree of interaction or reaction between the various ingredients or components is not known with any great degree of certainty. Therefore, the term "catalyst system" or "catalyst composition" has been employed to encompass a simple mixture of the ingredients, a complex of the various ingredients that is caused by physical or chemical forces of attraction, a chemical reaction product of the ingredients, or a combination of the foregoing.

The production of polymer by using the lanthanide-based catalyst system generally employs a catalytically effective amount of the foregoing catalyst composition. The total catalyst concentration to be employed in the polymerization mass depends on the interplay of various factors such as the purity of the ingredients, the polymerization temperature, the polymerization rate and conversion desired, the molecular weight desired, and many other factors. Accordingly, a specific total catalyst concentration may not be definitively set forth except to say that catalytically effective amounts of the respective catalyst ingredients should be used. In one or more embodiments, the amount of the lanthanide compound used may be varied from about 0.001 to about 2 mmol, in other embodiments from about 0.01 to about 1 mmol, and in other embodiments from about 0.05 to about 0.5 mmol per 100 g of conjugated diene monomer.

Dicyclopentadiene, substituted dicyclopentadiene, or mixtures thereof can be employed in the present invention. As is known in the art, dicyclopentadiene is a dimer of cyclopentadiene. Substituted dicyclopentadiene is a dimer of substituted cyclopentadiene wherein one or more of the hydrogen atoms of cyclopentadiene are replaced with a substituent such as a hydrocarbyl group. Substituted dicyclopentadiene can be a homo-dimer that is formed by the dimerization of two molecules of the same substituted cyclopentadiene. Substituted dicyclopentadiene can also be a hetero-dimer that is formed by the cross-dimerization of one molecule of a substituted cyclopentadiene with one molecule of another different substituted cyclopentadiene. Substituted dicyclopentadiene can have various isomers depending on the positions of the substituents.

In one or more embodiments, dicyclopentadiene or substituted dicyclopentadiene may be represented by the following formula:

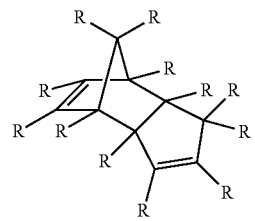

where each R is individually selected from the group consisting of a hydrogen atom and a hydrocarbyl group. In one or more embodiments, the hydrocarbyl groups, which may include substituted hydrocarbyl groups, can include, but are not limited to, alkyl, cycloalkyl, substituted cycloalkyl, alkenyl, cycloalkenyl, substituted cycloalkenyl, aryl, allyl, substituted aryl, aralkyl, alkaryl, or alkynyl groups. In one or more embodiments, these groups may include from one, or the appropriate minimum number of carbon atoms to form the group, to 20 carbon atoms.

Specific examples of substituted dicyclopentadiene compounds include dimethyldicyclopentadiene, diethyldicyclopentadiene, dicyclohexyldicyclopentadiene, and diphenyldicyclopentadiene. Each of these substituted dicyclopentadiene compounds can have various isomers depending on the positions of the hydrocarbyl substituents. Those skilled in the art appreciate that dicyclopentadiene or substituted dicyclopentadiene may also be referred to as cyclopentadiene dimer or substituted cyclopentadiene dimer. For example, dicyclopentadiene may be referred to as cyclopentadiene dimer, and dimethyldicyclopentadiene may be referred to as methylcyclopentadiene dimer. For ease of description, dicyclopentadiene and substituted dicyclopentadiene may be collectively referred to as Cp dimer.

In one or more embodiments, the amount of Cp dimer employed may be described with respect to the molar ratio of Cp dimer to the lanthanide compound (Cp dimer/Ln). In one or more embodiments, the molar ratio of Cp dimer to the lanthanide compound is at least 0.1:1, in other embodiments at least 0.5:1, in other embodiments at least 1.0:1, and in other embodiments at least 1.5:1. In these or other embodiments, the molar ratio of Cp dimer to the lanthanide compound is less than 5:1, in other embodiments less than 4:1, in other embodiments less than 3:1, and in other embodiments less than 2.5:1.

In one or more embodiments, the bulk polymerization process is initiated by providing in a reaction vessel a polymerizable composition that includes monomer, the catalyst system, and Cp dimer. Because the polymerization may be carried out as a batch process, a continuous process, or a semi-continuous process, the manner in which the monomer, catalyst system and Cp dimer are charged may vary. In one or more embodiments, the polymerization process is conducted under anaerobic conditions. Bulk polymerization of conjugated dienes is further described in U.S. Pat. No. 7,094,849 and U.S. Published App. No. 2005/0197474 A1, both of which are incorporated herein by reference.

In one or more embodiments, especially where the conversion is to be less than about 60%, the bulk polymerization may be conducted in a conventional stirred-tank reactor. For higher conversions, an elongated reactor in which the cement under polymerization is driven to move by piston, or extruders in which the cement is pushed along by a self-cleaning single-screw or double-screw agitator may be employed.

In one or more embodiments, the catalyst ingredients may be charged to the vessel or reactor employed for polymerization by using a variety of techniques and orders of addition. In one embodiment, a small quantity of an organic solvent may be employed as a carrier to either dissolve or suspend the catalyst ingredients in order to facilitate the delivery of the catalyst ingredients to the polymerization system. In yet another embodiment, conjugated diene monomer may be used as the catalyst carrier.

In one embodiment, the lanthanide-based system may be pre-formed and aged prior to use.

In one or more embodiments, Cp dimer may be pre-mixed with one or more components of the catalyst system. In other embodiments, the Cp dimer may be pre-mixed with the monomer prior to contacting the monomer with all of the catalyst ingredients. In other embodiments, the lanthanide compound and the Cp dimer may be introduced to the monomer to be polymerized prior to introducing the remaining catalyst ingredients to the monomer. In one or more embodiments, the Cp dimer may be aged with one or more of the catalyst ingredients. In other embodiments, the Cp dimer may be introduced into the reactor via a separate feed line.

In one or more embodiments, the temperature and pressure within the reactor is controlled to maintain the bulk of the monomer in the liquid phase. In one or more embodiments, the polymerization temperature may be controlled below about 80° C., in other embodiments below about 55° C., and in other embodiments below about 45° C., with one or more embodiments being from about 15° C. to about 33° C., and other embodiments from about 24° C. to about 32° C.

In one or more embodiments, the temperature of the polymerization mixture may be controlled by externally cooling the vessel in which the polymerization takes place, internally cooling the reaction by removal of monomer vapor, or by using a combination of the two methods. In one embodiment, monomer vapor may be removed from the vessel and condensed for future polymerization within the process. For example, an auto-refrigeration loop may be employed whereby monomer vapor may be removed from the vessel, condensed, and re-circulated back into the vessel. In other embodiments, the vessel may be equipped with an evaporation column that may be controlled by water flow and/or water temperature. Alternatively, the vapor may be removed, condensed, and the monomer condensate may be fed to a storage tank.

In one or more embodiments, an appropriate head space may be maintained within the vessel to achieve a desired cooling effect from the vaporization of monomer. This head space, which includes that volume of the vessel that is not filled with the polymerization mixture but which may contain monomer vapor, may be about 35% to about 65%, and in other embodiments from about 45% to about 55% by volume of the vessel.

Advantageously, Cp dimer is substantially inert to the lanthanide-based catalyst system at useful operating temperatures. But, at inappropriately high temperatures (i.e., temperatures at which a runaway reaction may occur), Cp dimer undergoes thermal decomposition to form cyclopentadiene or substituted cyclopentadiene, which inactivates the lanthanide-based catalyst and thereby terminates the polymerization. Thus, runaway reactions may be avoided. In one or more embodiments, the Cp dimer decomposes to form cyclopentadiene or substituted cyclopentadiene at a temperature of 100° C. or greater. In one or more embodiments, the polymerization is terminated if the polymerization temperature reaches 100° C. or greater.

When the reaction temperature is maintained at less than 100° C., the bulk polymerization according to this invention may be carried out to any desired conversions before the polymerization is terminated. In certain embodiments, however, high cement viscosity may result at high conversions. This may result in the separation of polymer as a solid phase from the monomer due to the limited solubility of, for example, cis-1,4-polybutadiene in 1,3-butadiene monomer.

In one or more embodiments, monomer is allowed to polymerize to a maximum monomer conversion of up to about 60%, in other embodiments up to about 40%, in other embodiments up to about 20%, and in yet other embodiments up to about 10%, based upon the total weight of monomer added to the polymerization mixture. In one embodiment, the monomer conversion is in the range of from about 5% to about 60%, in another embodiment, from about 10% to about 40%, and in yet another embodiment, from about 15% to 30%, In these or other embodiments, the polymerization mixture may be characterized as a single-phase homogeneous mixture.

The polymerization reaction may be terminated by using techniques known in the art. For example, useful techniques include the addition of a protonating or quenching agent. These compounds are believed to react or interact with living or pseudo-living polymer chains and prevent further chain growth or polymerization.

For example, reactive or reacting polymers may be quenched or protonated by reacting them with a proton source. Compounds or agents that may be employed to provide a proton source include water, alcohols (e.g., isopropyl alcohol), butylated hydroxyl toluene (BHT), organic acids (e.g., carboxylic acids), and inorganic acids. In one or more embodiments, an antioxidant such as 2,6-di-tert-butyl-4-methylphenol may be added along with, before, or after the addition of the terminator. The amount of the antioxidant employed is typically in the range of about 0.2% to about 1% by weight of the polymer product. In one or more embodiments, the terminator and the antioxidant may be added as neat materials or, if necessary, they may be dissolved in a hydrocarbon solvent or conjugated diene monomer prior to being added to the polymerization mixture.

Optionally, the living or pseudo-living polymers may be reacted with a functionalizing agent or coupling agent prior to termination. Exemplary functionalizing or coupling agents include, but are not limited to, metal halides, metalloid halides, alkoxysilanes, imine-containing compounds, esters, ester-carboxylate metal complexes, alkyl ester carboxylate metal complexes, aldehydes or ketones, amides, isocyanates, isothiocyanates, imines, and epoxides. These types of coupling and functionalizing agents are described in, among other places, U.S. Pat. No. 6,977,281 and U.S. Pat. No. 6,992,147; U.S. Pat. Nos. 4,906,706, 4,990,573, 5,064,910, 5,567,784, and 5,844,050; Japanese Patent Application Nos. 05-051406A, 05-059103A, 10-306113A, and 11-035633A, which are incorporated herein by reference. The polymer, which may be living or pseudo-living, may be contacted with a coupling or functionalizing agent prior to contacting the polymerization mixture with the terminator or an antioxidant.

In one or more embodiments, the amount of coupling or functionalizing agent employed may vary from about 0.01 to about 100 moles, in other embodiments from about 0.1 to about 50 moles, and in other embodiments from about 0.2 to about 25 moles per mole of the living or pseudo-living polymer.

When the polymerization has been stopped, the polymer product may be recovered from the polymerization mixture by using any conventional procedures of desolventization and drying that are known in the art. Monomer and solvent may be removed by employing a variety of techniques, or a combination thereof, as is known in the art. For example, the temperature of the polymerization mixture may be increased or maintained at a temperature sufficient to volatilize the monomer. Also, the pressure within the vessel may be decreased, which may likewise assist in the volatilization of monomer. Still further, the polymerization mixture may be agitated, which may further assist in the removal of monomer from the polymerization mixture. In one embodiment, a combination of heat, decreased pressure, and agitation may be employed. In one embodiment, a devolatilizer may be employed. Devolatilizers may include a devolatilizing extruder, which typically includes a screw apparatus that may be heated by an external heating jacket. These extruders are known in the art such as single and twin screw extruders. The polymer product may then be baled, and in certain embodiments diced or pelletized prior to baling.

In one or more embodiments, the bulk polymerization process may be characterized as a multi-step process, and includes a first stage wherein partial polymerization of available monomer is achieved in the bulk phase followed by a second stage where at least a portion of unreacted monomer is removed and the degree of polymerization is controlled. A multi-step bulk polymerization process is described in U.S. Published Patent Application No. 2005/0197474 A1, which is incorporated herein by reference.

In one or more embodiments, the first stage of the process includes a continuous polymerization process whereby catalyst, monomer, and Cp dimer are continuously fed to a vessel and a portion of the polymerization mixture is continuously removed from the vessel. Inasmuch as the degree of polymerization or monomer conversion is controlled in the first stage, the polymerization mixture removed from the vessel may include monomer, polymer, residual catalyst, and Cp dimer.

Once the desired monomer conversion is achieved in the first stage of the process, the polymerization mixture may be removed from the first vessel employed in the first stage and transferred to a second stage, which takes place in a second vessel. Within this second stage, the polymerization reaction may be terminated. Alternatively, the polymerization reaction may be terminated between the first and second stages. In one or more embodiments, the second stage of the process includes the separation of solvent and unreacted monomer from the polymer product. In those embodiments where the polymer product from the second stage contains more than a desired amount of solvent or unreacted monomer, additional treatment of the polymer product may be carried out.

In one or more embodiments, the process of this invention may allow for the production of polymers having targeted properties. In certain embodiments, the process may advantageously be employed to synthesize polybutadiene having particular characteristics that allow the polybutadiene to be employed for specialized uses.

In one or more embodiments, the process of this invention may produce polybutadiene having a molecular weight distribution of less than 4, in other embodiments less than 3.5, in other embodiments less than 3, and in other embodiments less than 2.5.

In one or more embodiments, the process of this invention may advantageously be employed to produce polybutadiene having a cis content in excess of about 97, in other embodiments in excess of about 98, and in other embodiments in excess of about 99.

In one or more embodiments, the polymers may advantageously be synthesized to have a number average molecular weight of about 40,000 to about 250,000, in other embodiments, about 60,000 to about 200,000, and in yet other embodiments, 80,000 to about 150,000. In one or more embodiments, the polymers may be characterized by a Mooney Viscosity ($ML_{1+4}$) of about 10 to about 80, in other embodiments, about 20 to about 70, and in yet other embodiments, about 30 to about 50.

The characteristics of the polymers produced according to this invention make them advantageous for a number of uses. For example, the cis-1,4-polybutadiene exhibits excellent viscoelastic properties and is particularly useful in the manufacture of various tire components including, but not limited to, tire treads, sidewalls, subtreads, and bead fillers. The cis-1,4-polybutadiene may be used as all or part of the elastomeric component of a tire stock. When the cis-1,4-polybutadiene is used in conjunction with other rubbers to form the elastomeric, component of a tire stock, these other rubbers may be natural rubber, synthetic rubbers, and mixtures thereof. Examples of synthetic rubber include polyisoprene, poly(styrene-co-butadiene), polybutadiene with low cis-1,4 linkage content, poly(styrene-co-butadiene-co-isoprene), and mixtures thereof. The cis-1,4-polybutadiene may also be used in the manufacture of hoses, belts, shoe soles, window seals, other seals, vibration damping rubber, and other industrial products.

In order to demonstrate the practice of the present invention, the following examples have been prepared and tested. The examples should not, however, be viewed as limiting the scope of the invention. The claims will serve to define the invention.

EXAMPLES

Example 1

Control Experiment

The polymerization reactor included a one-gallon, stainless-steel cylinder equipped with a mechanical agitator (shaft and blades) capable of mixing high viscosity polymer cement. The top of the reactor was connected to a reflux condenser system for conveying, condensing, and recycling the 1,3-butadiene vapor developed inside the reactor throughout the duration of the polymerization. The reactor was also equipped with a cooling jacket containing a stream of cold water. The heat of polymerization was dissipated partly by internal cooling through the use of the reflux condenser system and partly by external cooling through heat transfer to the cooling jacket.

The reactor was thoroughly purged with a stream of dry nitrogen, which was then replaced with 1,3-butadiene vapor by charging 100 g of dry 1,3-butadiene monomer to the reactor, heating the reactor to 65° C., and then venting the 1,3-butadiene vapor from the top of the reflux condenser system until no liquid 1,3-butadiene remained in the reactor. Cooling water was applied to the reflux condenser and the reactor jacket, and 1302 g of 1,3-butadiene monomer was charged into the reactor. After the monomer was thermostated at 32° C., 29.1 mL of 0.68 M triisobutylaluminum (TIBA) in hexane was charged into the reactor followed by the addition of 4.6 mL of 0.054 M neodymium (III) versatate (NdV$_3$). After the mixture inside the reactor was allowed to age for 5 minutes, the polymerization was started by charging 5.0 mL of 0.074 Methylaluminum dichloride (EADC) in hexane into the reactor. After 27.9 minutes from its commencement, the polymerization mixture was quenched by diluting with 1360 g of hexane containing 4.6 mL of isopropanol and then dropping the batch to 3 gallons of isopropanol containing 5 g of 2,6-di-tert-butyl-4-methylphenol. The coagulated polymer was drum-dried and its characterization is shown in Table 1.

Example 2

The polymerization experiment described in Example 1 was repeated except that 5.0 mL of 0.05 M dicyclopentadiene in hexane was added to the 1,3-butadiene monomer before the addition of the catalyst components. Characterization data for the coagulated polymer is shown in Table 1.

TABLE 1

| | Example | |
|---|---|---|
| | 1 | 2 |
| dicyclopentadiene/Nd molar ratio | 0/1 | 1/1 |
| % conversion | 9.5 | 10.4 |
| ML$_{1+4}$ | 21.3 | 23.2 |
| Mn (×10$^3$ g/mol) | 95 | 99 |
| Mw (×10$^3$ g/mol) | 332 | 334 |
| MWD | 3.5 | 3.4 |
| % cis | 98.8 | 98.9 |
| % trans | 0.8 | 0.8 |
| % vinyl | 0.4 | 0.3 |

A comparison of the results obtained in Examples 1 and 2 indicates that dicyclopentadiene does not inhibit polymerization under normal operation temperatures.

Example 3

Control Experiment

To conduct this experiment, a Vent Sizing Package (VSP) calorimeter, purchased from Fauske and Associates, was used to perform the runaway polymerization. The VSP unit, which houses a cylindrical, stainless-steel test cell of 116 millimeter volume, equipped with a magnetic stir bar functioned as the polymerization reactor. The top of the test cell was connected to a pressure sensor and thermocouple to monitor the increase in pressure and temperature. The test cell was contained in a high pressure bomb under adiabatic conditions. It was purged with nitrogen and charged with 37.6 g of 1,3-butadiene monomer and 1.4 mL of hexane. The 1,3-butadiene monomer was heated to 32° C. In a glass bottle, 0.16 mL of a 22.0 wt % 1,3-butadiene in hexane solution was combined with 0.84 mL of 0.68 M triisobutylaluminum (TIBA) followed by the addition of 0.13 mL of 0.054 M neodymium(III) versatate (NdV$_3$) in hexane. Formation of the catalyst was completed after the addition of 0.14 mL of 0.074 Methylaluminum dichloride (EADC) in hexane. The catalyst solution was charged via a syringe into the test cell containing the 1,3-butadiene monomer, and the temperature and pressure were monitored throughout the polymerization.

Upon the addition of the catalyst, a rapid increase in temperature and pressure occurred as the polymerization proceeded (see FIG. 1). Upon reaching about 250° C., the polymerization was under runaway conditions and rapidly accelerated until the abrupt increase in pressure caused the test cell to rupture.

Example 4

Figure 2:
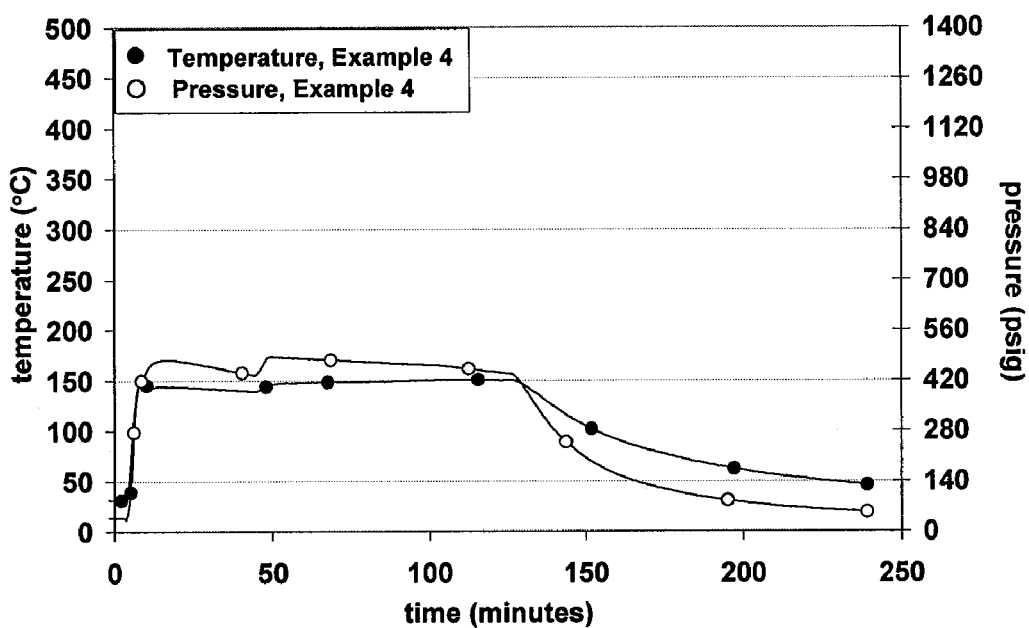
FIG. 2 is a temperature and pressure profile of the polymerization described in Example 4.

The polymerization experiment described in Example 3 was repeated except that 1.4 mL of 0.015 M dicyclopentadiene in hexane was added to the test cell instead of 1.4 mL of hexane. Upon charging the catalyst solution into the test cell, the temperature rapidly accelerated past 100° C. before stabilizing at 146° C. as shown in FIG. 2. The temperature and pressure inside the test cell did not increase for the following 2 hours. Upon cooling the test cell, polymerization did not reinitiate. A comparison of the results obtained in Examples 3 and 4 indicates that the presence of dicyclopentadiene prevented an abrupt increase in temperature and pressure, thereby avoiding runaway polymerization conditions.

Although dicyclopentadiene was found to be a successful polymerization inhibitor under runaway conditions, several other compounds were investigated as possible alternatives. The results are shown in the following examples.

Example 5

Comparative Example

In this experiment, butadiene sulfone was investigated. The polymerization experiment described in Example 1 was repeated except that 0.029 grams (0.25 mmol) of butadiene sulfone was added to the 1,3-butadiene monomer before the addition of the catalyst components. The polymerization reaction did not occur in the presence of butadiene sulfone indicating that butadiene sulfone poisoned the catalyst. Since butadiene sulfone is not inert under normal operating polymerization conditions, it is not a useful runaway polymerization inhibitor for this invention.

Example 6

Comparative Example

Figure 3:
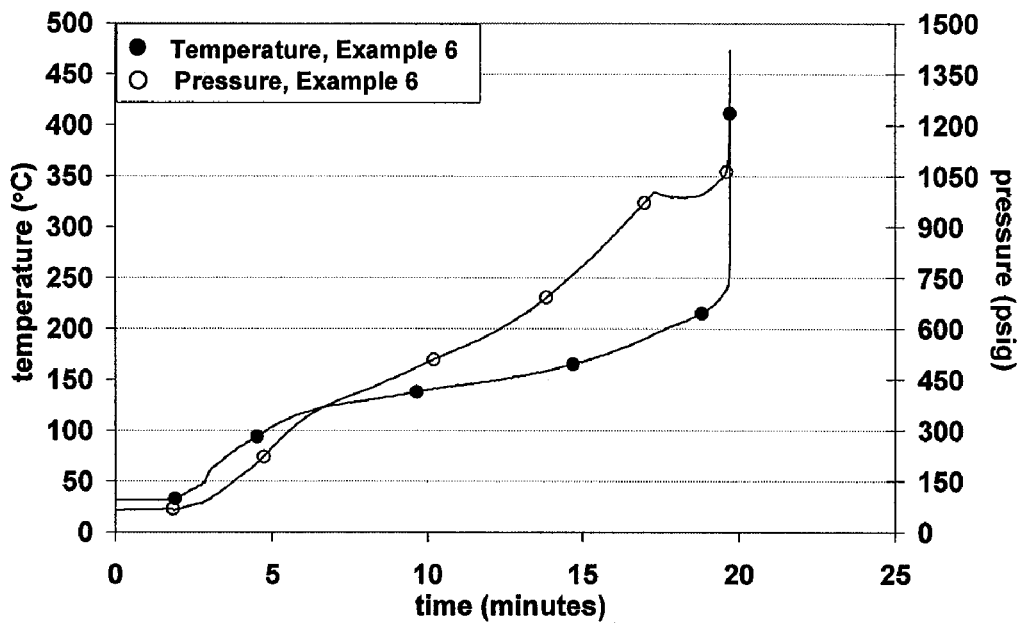
FIG. 3 is a temperature and pressure profile of the polymerization described in Example 6.

In this experiment, chromium hexacarbonyl was investigated. The polymerization experiment described in Example 3 was repeated except that 0.0015 grams (0.007 mmol) of chromium hexacarbonyl was added to the 1,3-butadiene monomer before the addition of the catalyst components. Upon charging the catalyst solution into the test cell, the temperature rapidly accelerated past 100° C. as shown in FIG. 3. Upon reaching about 250° C., the polymerization was under runaway conditions and rapidly accelerated until the abrupt increase in pressure caused the test cell to rupture. Therefore, chromium hexacarbonyl is not a suitable inhibitor for the runaway bulk polymerization of 1,3-butadiene.

Example 7

Comparative Example

Figure 4:
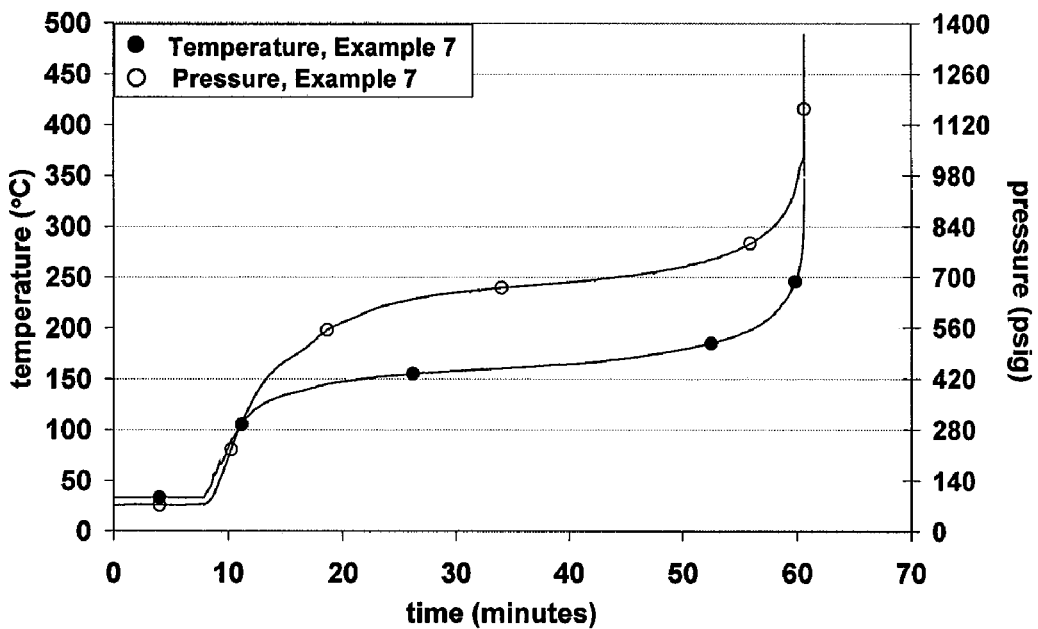
FIG. 4 is a temperature and pressure profile of the polymerization described in Example 7.

In this experiment, glutaric acid was investigated. The polymerization experiment described in Example 3 was repeated except that 0.0028 grams (0.021 mmol) of glutaric acid was added to the 1,3-butadiene monomer before the addition of the catalyst components. Upon charging the catalyst solution into the test cell, the temperature rapidly accelerated past 100° C. as shown in FIG. 4. Upon reaching about 250° C., the polymerization was under runaway conditions and rapidly accelerated until the abrupt increase in pressure caused the test cell to rupture. Therefore, glutaric acid is not a suitable inhibitor for the runaway bulk polymerization of 1,3-butadiene.

Example 8

Comparative Example

Figure 5:
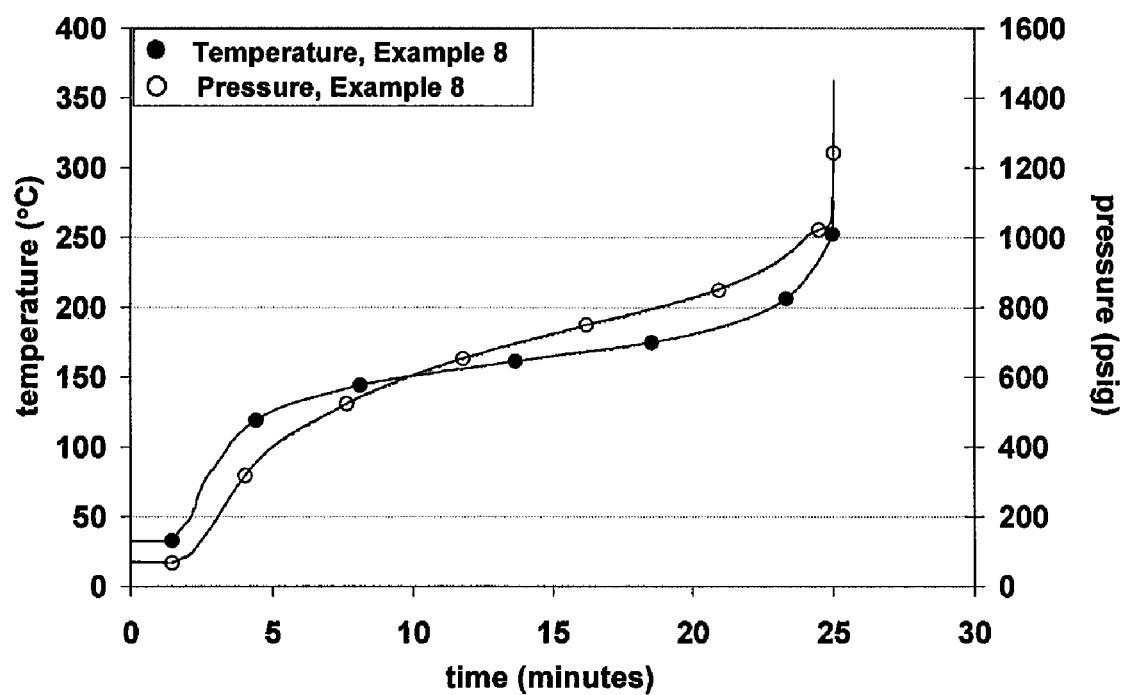
FIG. 5 is a temperature and pressure profile of the polymerization described in Example 8.

In this experiment, a mixture of malic acid and calcium carbonate was investigated. The polymerization experiment described in Example 3 was repeated except that 0.0028 grams (0.021 mmol) of malic acid and 0.0021 grams (0.021 mmol) calcium carbonate were added to the 1,3-butadiene monomer before the addition of the catalyst components. Upon charging the catalyst solution into the test cell, the temperature rapidly accelerated past 100° C. as shown in FIG. 5. Upon reaching about 250° C., the polymerization was under runaway conditions and rapidly accelerated until the abrupt increase in pressure caused the test cell to rupture. Therefore, a mixture of malic acid and calcium carbonate is not a suitable inhibitor for the runaway bulk polymerization of 1,3-butadiene.

Various modifications and alterations that do not depart from the scope and spirit of this invention will become apparent to those skilled in the art. This invention is not to be duly limited to the illustrative embodiments set forth herein.

What is claimed is:

1. A method for preparing a polydiene, the method comprising the steps of:
   (i) introducing conjugated diene monomer, a lanthanide-based catalyst system, and dicyclopentadiene or substituted dicyclopentadiene, to a reactor to form a liquid-phase polymerization mixture; and
   (ii) allowing the monomer to polymerize in the presence of the lanthanide-based catalyst system and the dicyclopentadiene or substituted dicyclopentadiene within the liquid-phase polymerization mixture to form a polydiene, where the catalyst system is formed by combining (a) a lanthanide compound, (b) an alkylating agent, and (c) a halogen-containing compound.

2. The method of claim 1, where the conjugated diene comprises 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene or a mixture thereof.

3. The method claim 2, where the lanthanide compound is a neodymium compound.

4. The method of claim 2, where the amount of lanthanide compound is present in an amount from about 0.001 to about 2 mmol per 100 g of conjugated diene monomer.

5. The method of claim 2, where the molar ratio of dicyclopentadiene or substituted dicyclopentadiene to lanthanide compound is at least 0.1:1.

6. The method of claim 2, where the molar ratio of dicyclopentadiene or substituted dicyclopentadiene to lanthanide compound is at least 0.1:1 and less than 5:1.

7. The method of claim 1, where the polymerization mixture includes a compound that is selected from the group consisting of dicyclopentadiene, dimethyldicyclopentadiene, diethyldicyclopentadiene, dicyclohexyldicyclopentadiene, and diphenyldicyclopentadiene.

8. The method of claim 1, where the polymerization mixture includes dicyclopentadiene.

9. The method of claim 1, where the liquid-phase polymerization mixture further comprises less than about 20% by weight of organic solvent based on the total weight of the polymerization mixture.

10. The method of claim 1, where the polymerization mixture is maintained below about 80° C.

* * * * *